(12) United States Patent
Nicholson et al.

(10) Patent No.: US 11,979,665 B2
(45) Date of Patent: May 7, 2024

(54) INTERLEAVING DISPLAY ON/OFF PERIODS AND CAMERA EXPOSURE ON/OFF PERIODS FOR CAMERA-UNDER-DISPLAY CONFIGURATIONS

(71) Applicant: LENOVO (Singapore) PTE. LTD., New Tech Park (SG)

(72) Inventors: John Weldon Nicholson, Cary, NC (US); Kevin Dao, Skokie, IL (US); Tin-Lup Wong, Chapel Hill, NC (US); Kazuo Fujii, Yokohama (JP)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 399 days.

(21) Appl. No.: 17/218,516

(22) Filed: Mar. 31, 2021

(65) Prior Publication Data

US 2022/0321755 A1 Oct. 6, 2022

(51) Int. Cl.
*H04N 23/72* (2023.01)
*G06F 1/16* (2006.01)

(52) U.S. Cl.
CPC ........... *H04N 23/72* (2023.01); *G06F 1/1605* (2013.01)

(58) Field of Classification Search
CPC ...... H04N 23/72; G06F 1/1605; G06F 1/1686
See application file for complete search history.

(56) References Cited

U.S. PATENT DOCUMENTS

| | | | |
|---|---|---|---|
| 2022/0116519 A1* | 4/2022 | Nikhara | G09G 5/12 |
| 2022/0116546 A1* | 4/2022 | Gummadi | G06V 40/20 |

\* cited by examiner

*Primary Examiner* — Mekonnen D Dagnew
(74) *Attorney, Agent, or Firm* — Kunzler Bean & Adamson

(57) ABSTRACT

Apparatus, methods, and program products for interleaving display ON/OFF periods and camera ON/OFF periods for camera-under-display (CUD) configurations are disclosed. One apparatus includes a display screen including a CUD area, the display screen configured for switching between display ON periods and display OFF periods, and a camera positioned behind the CUD area of the display screen, the camera configured for switching between exposure ON periods and exposure OFF periods. The apparatus further includes a processor and a memory that stores code executable by the processor. The code is executable by the processor to interleave the display ON/OFF periods and the exposure ON/OFF periods such that the CUD area appears to continuously display data and the camera is simultaneously able to capture images. Methods and computer program products that perform the operations and/or functions of the apparatus are also disclosed.

20 Claims, 16 Drawing Sheets

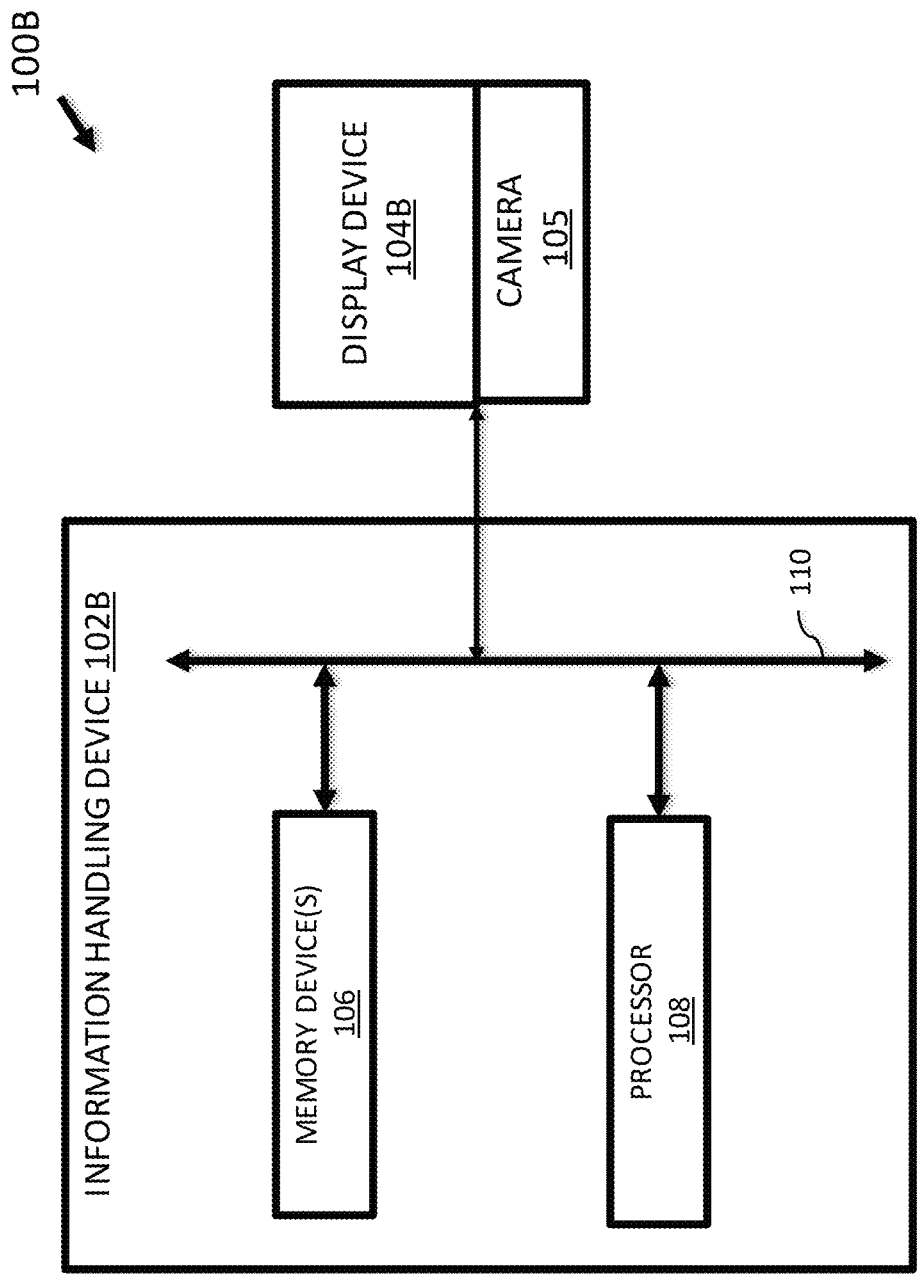

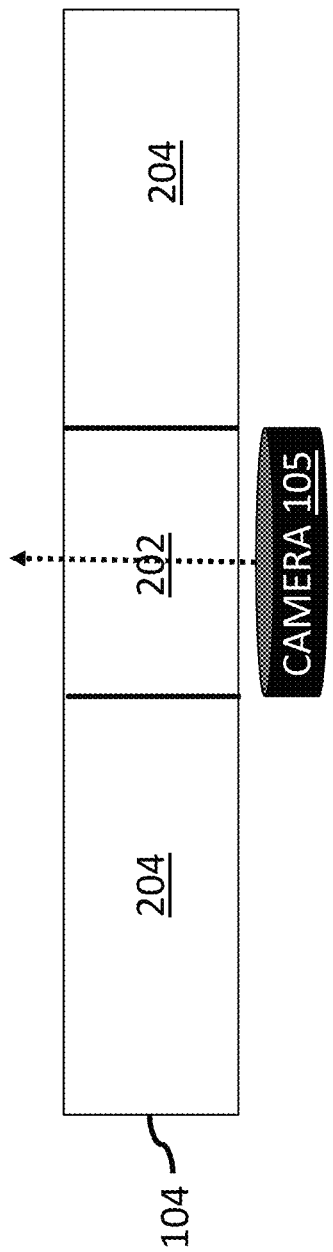
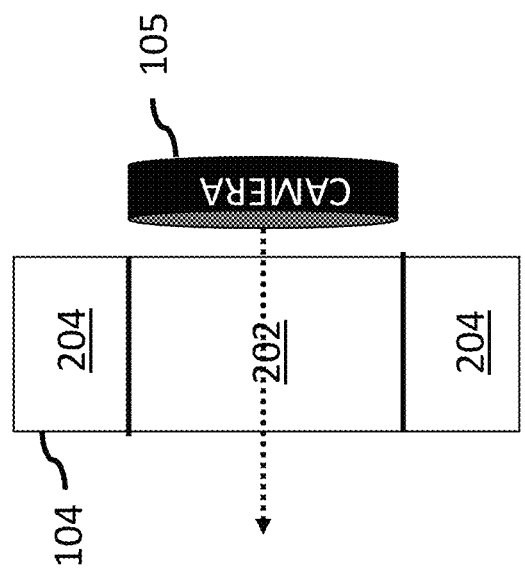

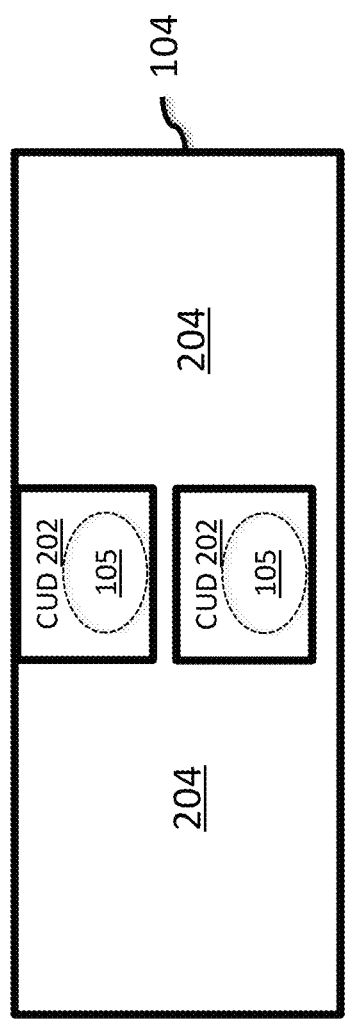
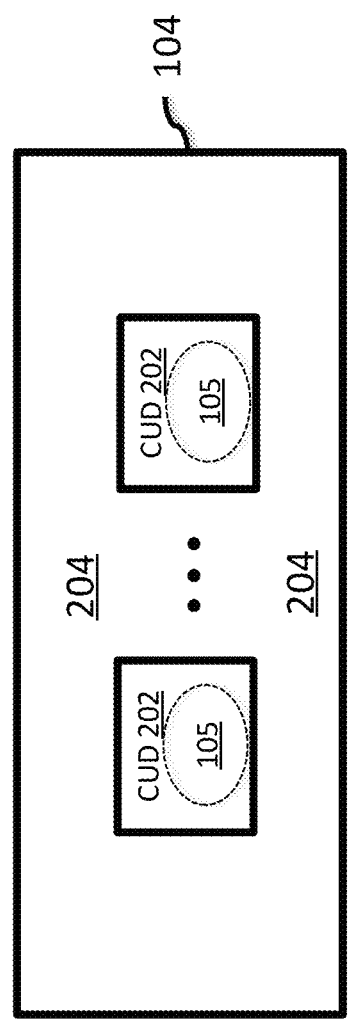
FIG. 3C
FIG. 3D

INTERLEAVING DISPLAY ON/OFF PERIODS AND CAMERA EXPOSURE ON/OFF PERIODS FOR CAMERA-UNDER-DISPLAY CONFIGURATIONS

FIELD

The subject matter disclosed herein relates to computing displays and more particularly relates to interleaving display ON/OFF periods and camera exposure ON/OFF periods for camera-under-display (CUD) configurations.

DESCRIPTION OF THE RELATED ART

Information handling devices, such as desktop computers, laptop computers, tablet computers, smart phones, and the like computing devices are ubiquitous in society. These information handling devices generally include and/or are connected to one or more display devices. Some of these display devices include a camera under the display device and are referred to as camera-under-display (CUD) configurations. The area of the display where the CUD configuration is located (e.g., the CUD area) typically forms a small portion of the overall display area.

In conventional CUD configurations, when the camera is switched ON, the display pixels in the CUD area are switched OFF. Similarly, when the display pixels of the display device are switched ON, the camera is switched OFF. In other words, the display pixels and the camera in conventional CUD configurations are not able to function simultaneously.

BRIEF SUMMARY

Apparatus, methods, and program products for interleaving display ON/OFF periods and camera exposure ON/OFF periods for camera-under-display (CUD) configurations are disclosed. One apparatus includes a display screen including a CUD area, the display screen configured for switching between display ON periods and display OFF periods, and a camera positioned behind the CUD area of the display screen, the camera configured for switching between camera exposure ON periods and camera exposure OFF periods for camera frames. The apparatus further includes a processor and a memory that stores code executable by the processor. The code is executable by the processor to interleave the display ON/OFF periods and the camera exposure ON/OFF periods such that the CUD area appears to continuously display data and the camera is simultaneously able to capture images.

A method includes switching, by a processor, a CUD area of a display screen between display ON periods and display OFF periods and switching a camera positioned behind the CUD area of the display screen between camera exposure ON periods and camera exposure OFF periods for camera frames. The method further includes interleaving the display ON/OFF periods and the camera exposure ON/OFF periods such that the CUD area appears to continually display data and the camera is simultaneously able to capture images.

One program product includes a computer-readable storage medium that stores code executable by a processor. The executable code, in certain embodiments, includes code to switch a CUD area of a display screen between display ON periods and display OFF periods, switch a camera positioned behind the CUD area of the display screen between camera exposure ON periods and camera exposure OFF periods for camera frames, and interleave the display ON/OFF periods and the camera exposure ON/OFF periods such that the CUD area appears to continually display data and the camera is simultaneously able to capture images.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 1A and 1B are schematic block diagrams of various embodiments of a computing device (and/or computing system) that can interleave display ON/OFF periods and camera exposure ON/OFF periods for camera-under-display (CUD) configurations;

FIGS. 2A and 2B are schematic block diagrams showing different views of one embodiment of a CUD area including a camera positioned behind the CUD area;

FIGS. 3A through 3E are schematic block diagrams of various embodiments of a display device including a CUD area and a camera positioned behind the CUD area;

DETAILED DESCRIPTION

Figure 1A:
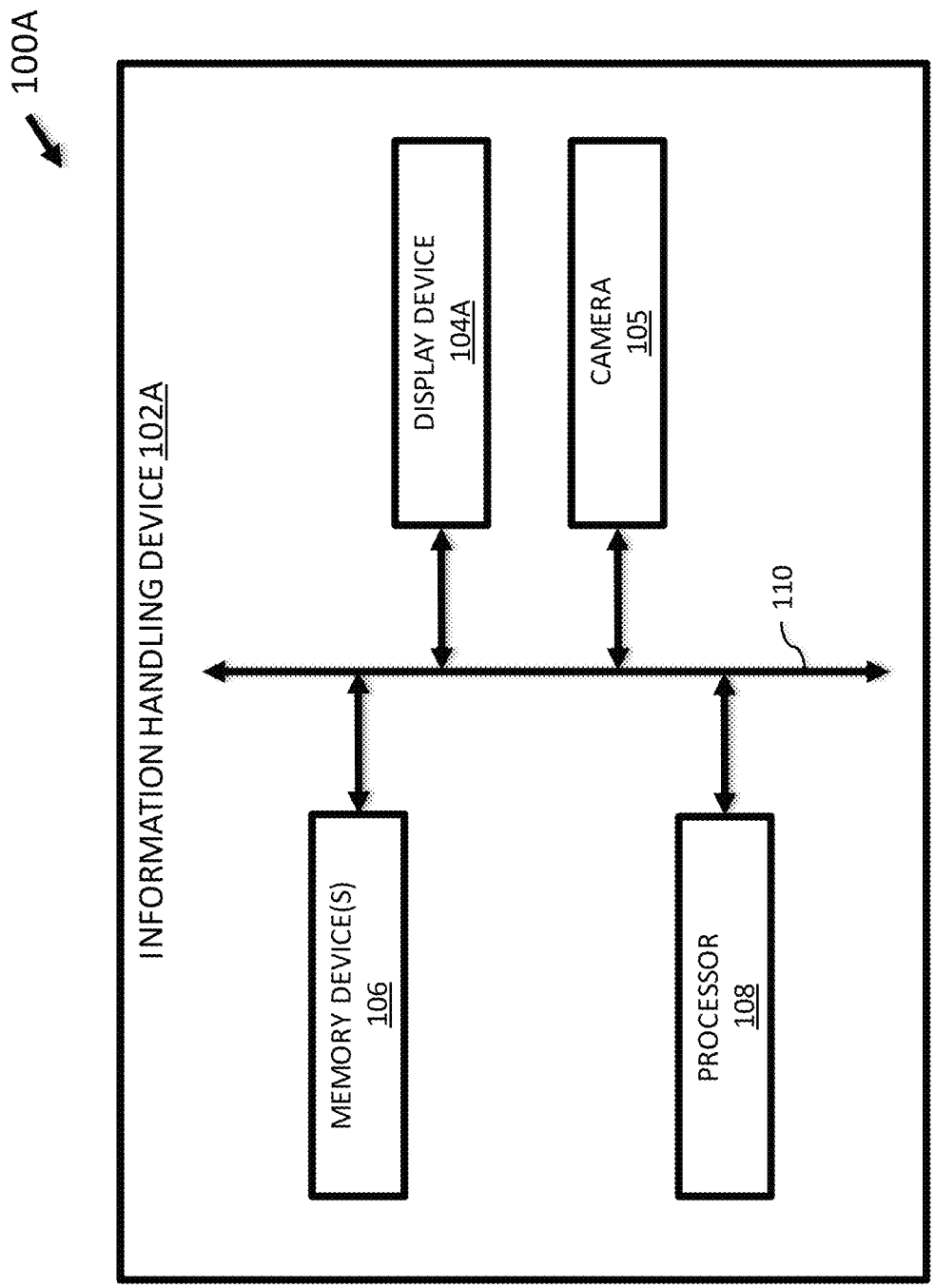

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram of one embodiment of a computing device 100A (and/or computing system) that can interleave display ON/OFF periods and camera exposure ON/OFF periods for camera-under-display (CUD) configurations. At least in the illustrated embodiment, the computing device 100A includes, among other components, an information handling device 102A (e.g., a laptop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other information handling devices that include an internal display device that are possible and contemplated herein). The information handling device 102A includes, among other components, a display device 104A, a camera 105 (e.g., an internal camera), a set of memory devices 106, and a processor 108 coupled to and/or in communication with one another via a bus 110 (e.g., a wired and/or wireless bus).

FIG. 1B is a schematic block diagram of another embodiment of a computing device 100B (and/or computing system) that can interleave display ON/OFF periods and camera exposure ON/OFF periods for camera-under-display (CUD) configurations. At least in the illustrated embodiment, the computing device 100B includes, among other components, an information handling device 102B (e.g., a desktop computer, a set-top box, a game console, a vehicle on-board computer, and a streaming device, etc., among other information handling devices that utilize an external display device that are possible and contemplated herein) coupled to and/or in communication with a display device 104B (e.g., an external display device or monitor, etc.) and a camera 105 (e.g., an external camera). The information handling device 102B includes, among other components, a set of memory devices 106 and a processor 108 coupled to and/or in communication with one another and the display device 104B via a bus 110 (e.g., a wired and/or wireless bus).

Referring again to FIG. 1A, a display device 104A may include any suitable hardware and/or software that can display digital information (e.g., digital data) thereon. In various embodiments, the display device 104A includes an internal display device or other similar device that can display data thereon that forms a portion of an information handling device 102A. In some embodiments, the display device 104A includes a touch screen that can receive one or more inputs from a user via the user's fingers and/or a stylus, etc. In various embodiments, the display device 104A includes a CUD configuration (see, e.g., CUD 202 in FIGS. 2A through 2E), as discussed in greater detail elsewhere herein.

With reference to FIG. 1B, a display device 104B may include any suitable hardware and/or software that can display digital information (e.g., digital data) thereon. In various embodiments, the display device 104B includes an external display device, monitor, and/or other similar device that can display data thereon that is separate from an information handling device 102B. In some embodiments, the display device 104B includes a stand-alone display device. In various embodiments, the display device 104B includes a CUD configuration (see, e.g., CUD 202 in FIGS. 2A through 2E), as discussed in greater detail elsewhere herein.

The display devices 104A and 104B (also simply referred to herein individually and/or collectively as, display device(s) 104) are configured to receive commands and/or instructions from a processor 108 for displaying data thereon. In various embodiments, a display device 104 includes a CUD configuration (see, e.g., CUD 202 in FIGS. 2A through 2E) and is further configured to receive commands and/or instructions from the processor 108 for operating the CUD configuration 202.

With reference to FIGS. 2A and 2B, FIGS. 2A and 2B are schematic block diagrams illustrating various views of one embodiment of a camera 105 and a display 104 that includes a CUD area 202 (or simply CUD 202) and a display area 204. At least in the embodiment illustrated in FIGS. 2A and 2B, the camera 105 is located behind, below, beneath, and/or under the CUD area 202 of a display 104 and the CUD area 202 is located adjacent to the remaining display area 204 of the display 104.

The camera 105 (see, also, FIGS. 1A and 1B) may include any suitable hardware and/or software that can capture digital images. In various embodiments, the camera 105 includes a user-facing camera. In additional or alternative embodiments, the camera 105 includes a webcam (e.g., a web-camera).

In some embodiments, the camera 105 includes a rolling shutter and may be referred to as, a rolling shutter camera 105. In other embodiments, the camera 105 includes a global shutter and may be referred to as, a global shutter camera 105. Various other embodiments of the camera 105 may include any suitable camera 105 that is known or developed in the future.

The camera 105 may include any suitable framerate that is known or developed in the future. In certain embodiments, the camera 105 includes a variable refresh rate (VRR).

In some embodiments, the camera 105 includes a framerate of thirty frames per second (30 FPS), which includes thirty-three and one-third milliseconds (33.33 ms) between frames. In other embodiments, the camera 105 can include a framerate of sixty frames per second (60 FPS) and sixteen and two-thirds milliseconds (16.67 ms) between frames, one hundred twenty frames per second (120 FPS) and eight and one-third milliseconds (8.33 ms) between frames, or two hundred forty frames per second (240 FPS) and four and one-sixth milliseconds (4.17 ms) between frames, etc., among other framerates that are possible and contemplated herein. While specific framerates for a camera 105 are disclosed herein, the various embodiments of a camera 105 are not limited to these specific framerates. That is, the various embodiments of the camera 105 can include other framerates.

The camera 105 may utilize any suitable exposure that is known or developed in the future. In some embodiments, the camera 105 includes an exposure rate in the range of about one millisecond (1 ms) to about one hundred milliseconds (100 ms), among other exposure rates that are less than 1 ms and greater than 100 ms that are possible and contemplated herein. In other embodiments, the camera 105 (e.g., a webcam) includes an exposure rate in the range of about fifteen milliseconds (15 ms) to about 60 milliseconds (60 ms), among other exposure rates that are less than 15 ms and greater than 60 ms that are possible and contemplated herein. While specific exposure rates and/or ranges of exposure rates for a camera 105 are disclosed herein, the various embodiments of a camera 105 are not limited to these specific exposure rates and/or ranges of exposure rates. That is, the various embodiments of the camera 105 can include other exposure rates and/or ranges of exposure rates.

A display 104 (see, also, FIGS. 1A and 1B) may include any suitable hardware and/or software that can display data thereon. The display 104 may include any suitable frequency rate and/or framerate that is known or developed in the future. In certain embodiments, the display 104 includes a variable refresh rate (VRR).

In some embodiments, the display 104 includes a frequency rate or sixty hertz (60 Hz) or a framerate of sixty frames per second (60 FPS), which includes sixteen and two-thirds milliseconds (16.67 ms) between frames. Other embodiments of the display 104 include a frequency rate of 30 Hz, (30 FPS) and 33.33 ms between frames, 120 Hz (120 FPS) and 8.33 ms between frames, or 240 Hz (240 FPS) and four and one-sixth milliseconds (4.17 ms) between frames, etc., among other frequency rates that are possible and contemplated herein.

In certain embodiments, the frequency rate selected for the display 104 is based on the framerate of the camera 105 or vice versa. In some embodiments, the frequency rate selected for the display 104 is proportional and/or a ratio of the framerate of the camera 105 or vice versa.

In some embodiments, the frequency rate selected for display 104 is twice (2×) the framerate of the camera 105 or the framerate of the camera 105 is half the frequency rate of the display 104, among other ratios that are greater than or less than 2:1 that are possible and contemplated herein. For example, the display 104 can include a frequency rate of 60 Hz (60 FPS) and the camera 105 can include a framerate of 30 FPS, among other frequency rates and/or framerates that include a ratio of 2:1, that are possible and contemplated herein. That is, various other embodiments contemplate using ratios of 1:1, 3:1, 3:2, 4:1, 4:3, etc., for the frequency rate of the display 104 and the framerate of the camera 105, among other ratios that are possible and contemplated herein.

In some embodiments, the frequency rate of the display 104 and the frequency rate for the camera 105 are the same frequency rate. In alternative embodiments, the frequency rate of the display 104 and the frequency rate of the camera 105 are different frequency rates. In certain embodiments, the frequency rate of the display 104 is greater than the frequency rate of the camera 105. In other embodiments, the frequency rate of the display 104 is less than the frequency rate of the camera 105.

The CUD 202 may include any suitable material and/or display configuration that is known or developed in the future. In some embodiments, the CUD 202 includes a transparent material defining a transparent region located in front of and/or above the camera 105, which can include any suitable transparent material that is known or developed in the future. The CUD 202 further includes a plurality of display pixels to facilitate the display of data on the CUD 202. During operation, the camera 105 looks up/out through the CUD 202 but is partially blocked by the plurality of display pixels, which define a display stack-up structure of the CUD 202. Various embodiments disclosed herein address this structure.

In various embodiments, the display stack-up structure and/or display pixels of the CUD 202 are configured to include the appearance and/or effect of illuminating at the same brightness as the pixels included in the other display area 204 of the display device 104. In some embodiments, the CUD 202 includes a gamma mask to increase the amount of light emitted by the display stack-up structure and/or display pixels of the CUD 202. Here, the gamma mask, along with an appropriate decrease in illumination time of the display stack-up structure and/or display pixels of the CUD 202, can facilitate the CUD 202 including the same degree of illumination and/or brightness as the other display area 204 of the display device 104.

Referring to FIGS. 3A through 3E, FIGS. 3A through 3E illustrate block diagrams of various embodiments of a display device 104. At least in the embodiments illustrated in FIGS. 3A and 3B, a display device 104 includes a CUD area 202 located in front of and/or above a camera 105 and also a display area 204 (e.g., a remaining display area 204 of the display device 104) for displaying data thereon.

Figure 3A:
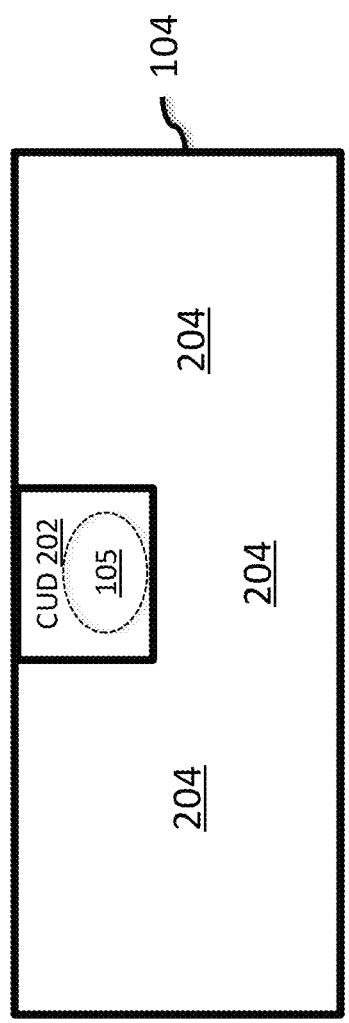
Figure 3B:
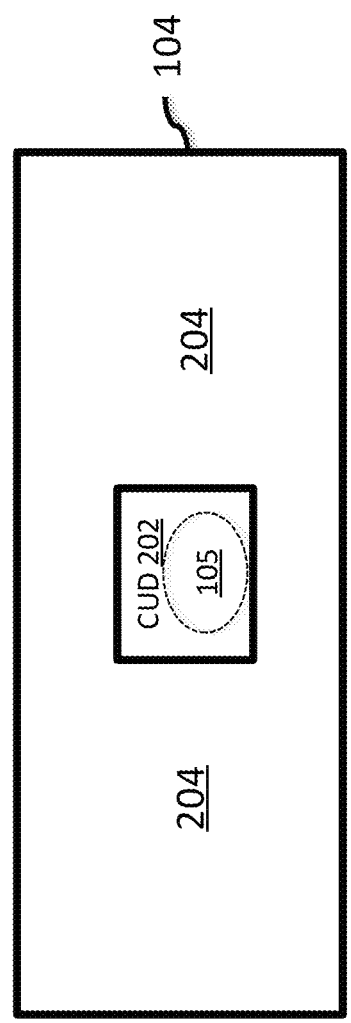

The CUD 202 may be positioned and/or located at any suitable position/location on the display device 104. At least in the embodiment illustrated FIG. 3A, the CUD 202 is located/positioned at the top-middle (or middle-top) of the display device 104. At least in the embodiment illustrated FIG. 3B, the CUD 202 is located/positioned in the middle or substantially in the middle of the display device 104 with the remaining display area 204 of the display device 104 surrounding the CUD 202. While FIGS. 3A and 3B illustrate specific embodiments and/or examples of where on a display device 104 the CUD 202 can be located, the various embodiments of the CUD 202 are not limited to the top-middle, middle, and/or substantial middle of a display device 104, as illustrated in FIGS. 3A and 3B. That is, various other embodiments contemplate that the CUD 202 can be located anywhere and/or at any position/location on a display device 104 (e.g., top-right, top-left, middle-right, middle-left, bottom-right, bottom-left, bottom-middle, etc., among other locations/positions that are possible and contemplated herein).

With reference to FIGS. 3C and 3D, various embodiments of a display device 104 include a plurality of CUD areas 202. At least in the embodiments illustrated in FIG. 3C, a display device 104 includes at least two CUD areas 202. The embodiment illustrated in FIG. 3D illustrates that a display device 104 may include any suitable quantity of CUD areas 202 that is greater than or equal to two CUD areas 202. In the embodiments illustrated in FIGS. 3C and 3D, each respective CUD area 202 can be located anywhere and/or at any suitable position/location on a display device 104 (e.g., top-right, top-left, middle-right, middle-left, bottom-right, bottom-left, bottom-middle, etc., among other locations/positions that are possible and contemplated herein).

Figure 3E:
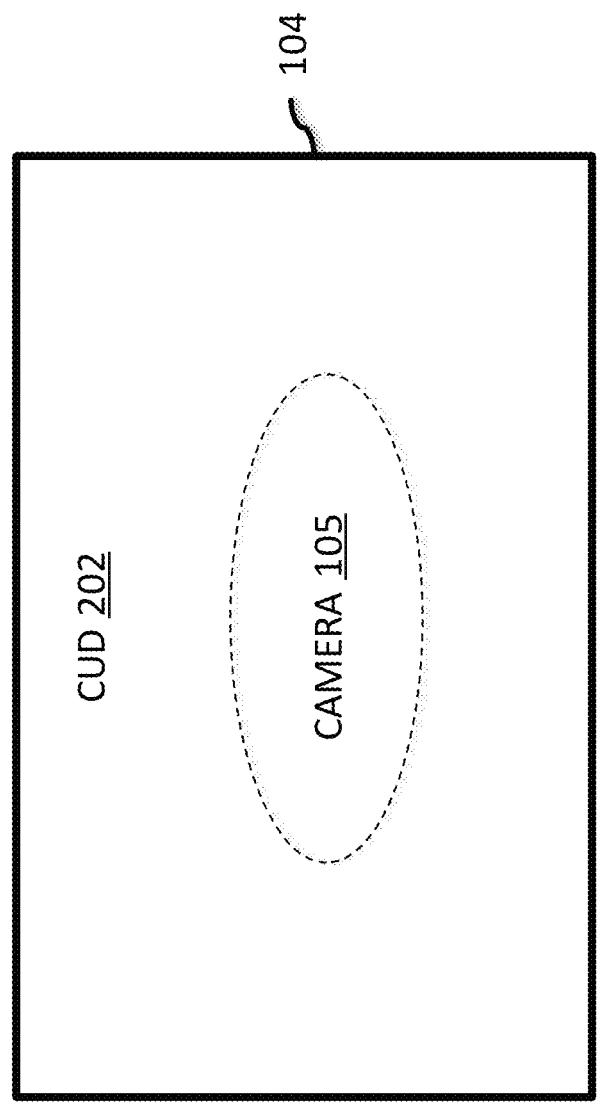

In the embodiment illustrated in FIG. 3E, the CUD 202 forms the entirety or the substantial entirety of the display device 104. That is, in this embodiment, the display device 104 does not include a display area 204.

With reference again to FIGS. 1A and 1B, a set of memory devices 106 may include any suitable quantity of memory devices 106. Further, a memory device 106 may include any suitable type of device and/or system that is known or developed in the future that can store computer-useable and/or computer-readable code. In various embodiments, a memory device 106 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A memory device 106, in some embodiments, includes volatile computer storage media. For example, a memory device 106 may include random access memory (RAM), including dynamic RAM (DRAM), synchronous dynamic RAM (SDRAM), and/or static RAM (SRAM). In other embodiments, a memory device 106 includes non-volatile computer storage media. For example, a memory device 106 may include a hard disk drive, a flash memory, and/or any other suitable non-volatile computer storage device that is known or developed in the future. In various embodiments, a memory device 106 includes both volatile and non-volatile computer storage media. In additional embodiments, a memory device 106 also stores program code and/or related data, such as an operating system (OS) and/or other controller algorithms operating on an information handling device 102.

Figure 4:
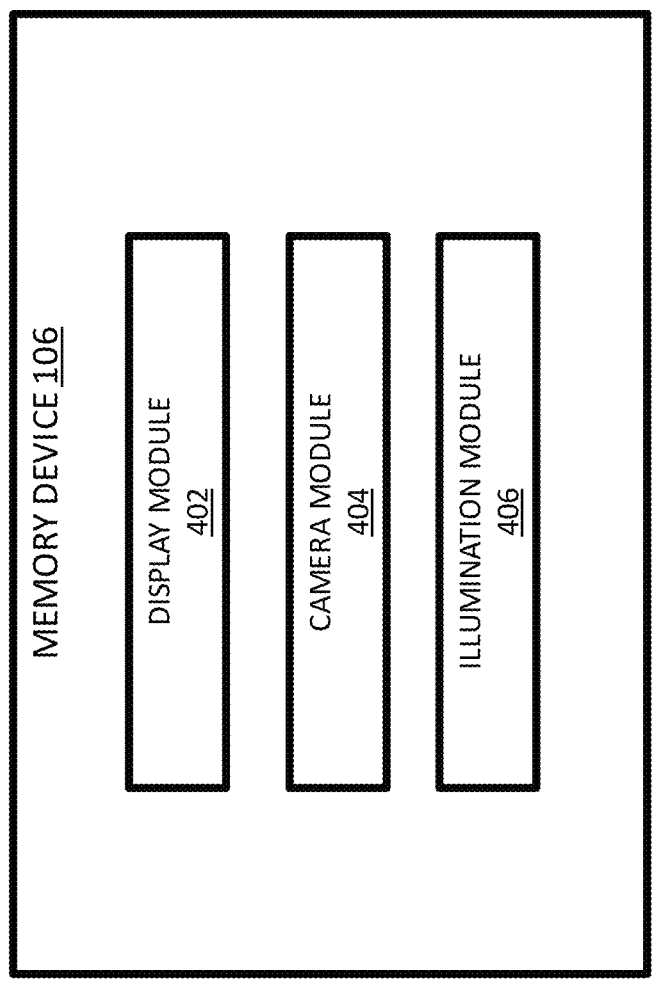
FIG. 4 is a schematic block diagram of one embodiment of a memory device that can be included in the computing devices (and/or computing systems) of FIGS. 1A and 1B.

Referring now to FIG. 4, FIG. 4 is a schematic block diagram of one embodiment of a memory device 106. At least in the illustrated embodiment, the memory device 106 includes, among other components, a display module 402, a camera module 404, and an illumination module 406.

A display module 402 may include any suitable hardware and/or software that can manage and/or control the display of data on the CUD 202 and display area 204 of a display device 104. Specifically, display module 402 may include any suitable hardware and/or software that can manage and/or control the ON/OFF periods of the display stack-up structure and/or display pixels of the CUD 202 and the display area 204 for displaying data thereon. In certain embodiments, the display module 402 is configured to coordinate the pixels in the CUD 202 and the display area 204 with one another in displaying data on the display device 104.

In certain embodiments, the display module 402 is configured to transmit data and/or information to the illumination module 406 regarding the amount of light being emitted by and/or the brightness at which the data on the display area 204 is being displayed so that the illumination module 406 can adjust the brightness of the CUD area 202, as discussed in greater detail elsewhere herein.

In various embodiments, the display module 402 is configured to transmit data and/or information to the camera module 404 so that the display module 402 and the camera module 404 can coordinate and/or cooperate with one another in displaying data on the CUD area 202 and display area 204 of the display device 104 while the camera 105 includes the ability to capture digital images. In additional or alternative embodiments, the display module 402 is configured to receive the data and/or information from the camera module 404 so that the display module 402 and the camera module 402 can coordinate and/or cooperate with one another in displaying data on the CUD area 202 and the display area 204 of the display device 104 while the camera 105 includes the ability to capture digital images.

In various embodiments, the display module 402 is configured to control and/or manage (e.g., place a display ON period and/or turn ON) the illumination of the CUD 202 and the display area 204 with the display data for a predetermined amount of time. In some embodiments (see, e.g., FIGS. 6, 7, and 9), the display module 402 is configured to turn ON the CUD 202 and/or display area 204 for the predetermined amount of time at the beginning or at substantially at the beginning of each display frame and extinguish (e.g., place a display OFF period and/or turn OFF) the CUD 202 and/or the display area 204 for the remainder of the time in each of the display frames. The predetermined amount of time that the data is illuminated and/or that the CUD 202 and/or the display area 204 is turned ON can be any suitable amount of time that enables the camera 105 to perform its respective functions, as discussed elsewhere herein. In some embodiments, the predetermined amount of time is about 1 ms, among other amounts of time that are greater than or less than 1 ms that are possible and contemplated herein.

In various other embodiments, the display module 402 is configured to turn ON the CUD 202 and/or the display area 204 with the display data for a predetermined amount of time that is delayed, skipped, different, and/or staggered (hereafter, simply "skipped") between a set of display frames. For example (see, e.g., FIG. 8), the display module 402 is configured to illuminate or turn ON the CUD 202 and/or the display area 204 at the beginning or at substantially at the beginning of a first display frame in the set of display frames, extinguish or turn OFF the CUD 202 and/or the display area 204 for the remainder of the time in the first display frame, keep/maintain the CUD 202 and/or the display area 204 turned OFF for a first portion of a subsequent display frame, turn ON the CUD 202 and/or the display area 204 for the predetermined amount of time during an intermediate portion of the subsequent display frame, and turn OFF the CUD 202 and/or the display area 204 for the remainder of the subsequent display frame. The predetermined amount of time that the data is illuminated and/or that the CUD 202 and/or the display area 204 is turned ON can be any suitable amount of time that enables the camera 105 to perform its respective functions, as discussed elsewhere herein. In some embodiments, the predetermined amount of time is about 1 ms, among other amounts of time that are greater than or less than 1 ms that are possible and contemplated herein. The various embodiments of the CUD 202 and/or the display area 204 are not limited to the above example. That is, various other embodiments, contemplate other ON periods/timing and OFF periods/timing for a set of display frames for the CUD 202 and/or the display area 204. In other words, the set of frames is not limited to two display frames and may include a greater quantity of display frames. Further, the various ON periods/timing for the CUD 202 and/or the display area 204 may not necessarily occur with the same amount of time between each consecutive pair of ON periods. That is, the ON periods can occur at regular intervals and/or random intervals between them. Furthermore, the intermediate portion of time can occur at any suitable time/timing during one or more subsequent display frames.

A camera module 404 may include any suitable hardware and/or software that can manage and/or control the camera exposure ON/OFF periods, camera exposure ON/OFF time, and/or exposure time of a camera 105. In various embodiments, the camera module 404 is configured to transmit data and/or information to the display module 402 so that the display module 402 and the camera module 404 can coordinate and/or cooperate with one another in displaying data on the CUD area 202 (and the display area 204) of the display device 104 while the camera 105 includes the ability to capture digital images. In additional or alternative embodiments, the camera module 404 is configured to receive the data and/or information from the display module 402 so that the display module 402 and the camera module 404 can coordinate and/or cooperate with one another in displaying data on the CUD area 202 (and the display area 204) of the display device 104 while the camera 105 includes the ability to capture digital images.

In various embodiments, the camera module 404 is configured to control and/or manage (e.g., place a camera exposure ON period and/or turn ON (e.g., a camera exposure ON time)) the camera 105 in capturing a set of digital images for a period of time. In certain embodiments, the camera module 404 is configured to operate the camera 105 with a global function during a camera frame. Embodiments including the global function can be utilized with cameras 105 that include a relatively short exposure time (e.g., an exposure time less than about 15 ms).

In one embodiment (see, e.g., timing 600 in FIG. 6), the camera module 404 begins a camera frame (e.g., camera frame 1) with the camera 105 turned OFF (e.g., a camera exposure OFF time 602) for a predetermined amount of time that coincides with a display ON time 606 or time in which the CUD 202 (and the display area 204) is turned ON (e.g., at the beginning of the display frame (e.g., display frame 1)). The camera module 404 then turns ON the camera 105 (e.g., places a camera exposure ON time 604) at a time during the camera frame 1 occurring after, immediately after, or substantially immediately after a time that coincides with the CUD 202 being turned OFF (e.g., at the beginning of a display OFF time 608). The camera module 404 keeps/maintains the camera 105 turned ON (e.g., a camera display ON time 604) for a predetermined period of time in camera frame 1 and turns OFF the camera 105 (e.g., a camera exposure OFF time 602) for the remainder of the camera frame 1 and for a predetermined amount of time (e.g., a period of time that coincides with the amount of time in display frame 2) that ends with the CUD 202 being turned ON (e.g., a display ON period 606 at the beginning of a subsequent display frame (e.g., display frame 3)). This process can then be repeated for subsequent camera frames and display frames.

The predetermined period of time that the camera 105 is turned ON (e.g., a camera exposure ON time 604) during camera frame 1 can be any suitable amount of time that allows the camera 105 sufficient exposure time. In some embodiments, the amount of time that the camera 105 is turned ON during camera frame 1 is based on and/or coincides with the exposure rate of the camera 105. Further, the exposure time of the camera 105 may be based on the amount of light and/or level of light in the environment surrounding the camera 105 (in combination with one or more other parameters (e.g., ISO/gain)).

Similarly, the predetermined amount of time that the camera 105 is turned OFF (e.g., a camera exposure OFF time 602) during the camera frame 1 can be any suitable amount of time. In some embodiments, the amount of time that the camera 105 is turned OFF during the camera frame 1 is based on and/or coincides with the amount of the display ON time to achieve a predetermined level of brightness for the CUD 202.

Figure 6:
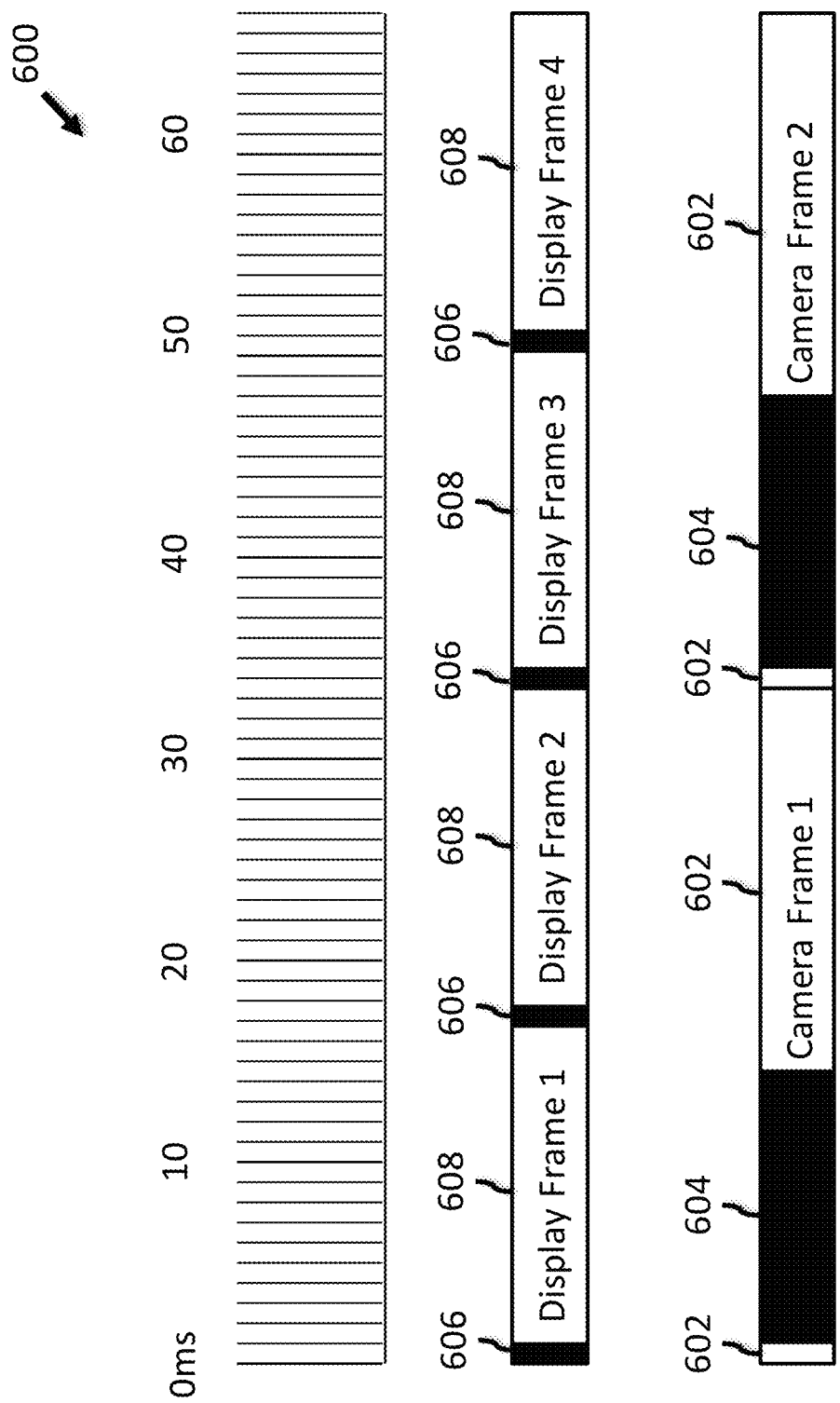
FIG. 6 is a timing diagram of one embodiment of the functions of a CUD module and a camera module included in the memory device of FIG. 4 and/or the processor of FIG. 5.

While the above embodiment of the camera module 404 and FIG. 6 are discussed and shown with a particular timing for a global function, the various embodiments of a camera module 404 utilizing a global function are not limited to the specific timing disclosed therein. That is, various other embodiments of a display module 402 managing a CUD area 202 and a camera module 404 managing a camera 105 utilizing a global function can include different display ON/OFF timings for the display 104 and/or different global camera exposure ON/OFF timings for the camera 105, each of which possibility is contemplated and included herein. That is, each possible display ON/OFF timing(s) for the CUD 202, each possible global camera exposure ON/OFF timing(s), and each possible combination(s) thereof are contemplated and included herein.

In some embodiments, the camera module 404 is configured to operate the camera 105 with a rolling or overlapping function during a camera frame in which a portion and/or part of a digital image is captured in a rolling or overlapping fashion. In one embodiment (see, e.g., timing 700 in FIG. 7), the camera module 404 begins a camera frame (e.g., camera frame 1) with the camera 105 turned OFF (e.g., a camera exposure OFF time 702) for a predetermined amount of time that coincides with a display ON time 606 or time in which the CUD 202 (and display area 204) is turned ON (e.g., at the beginning of the display frame (e.g., display frame 1)).

The camera module 404 then turns ON the camera 105 (e.g., a camera exposure ON time 704) at a time during the camera frame occurring after, immediately after, or substantially immediately after the CUD 202 is turned OFF (e.g., a display OFF time 708). The camera module 404 keeps/maintains the camera 105 turned ON (e.g., a camera exposure ON time 704) until a time that coincides with the CUD 202 being turned back ON (e.g., a display ON time 706 at the beginning of the next display frame (e.g., display frame 2)) and the camera module 404 then turns OFF the camera 105 (e.g., a camera exposure OFF time 702 (or pauses the camera 105)) for the predetermined amount of time. The camera module 404 then turns back ON the camera 105 (e.g., a camera exposure ON time 704) at a time during the camera frame occurring after, immediately after, or substantially immediately after the CUD 202 is turned OFF (e.g., a display OFF time 708) in the camera frame 1 for the camera 105 and the camera module 404 keeps/maintains the camera 105 turned ON (e.g., a camera exposure ON time 704) for the remainder of the camera frame 1, at which time the camera module 404 turns OFF the camera 105 (e.g., a camera exposure OFF time 702). This process can then be repeated for subsequent camera frames and display frames.

Figure 7:
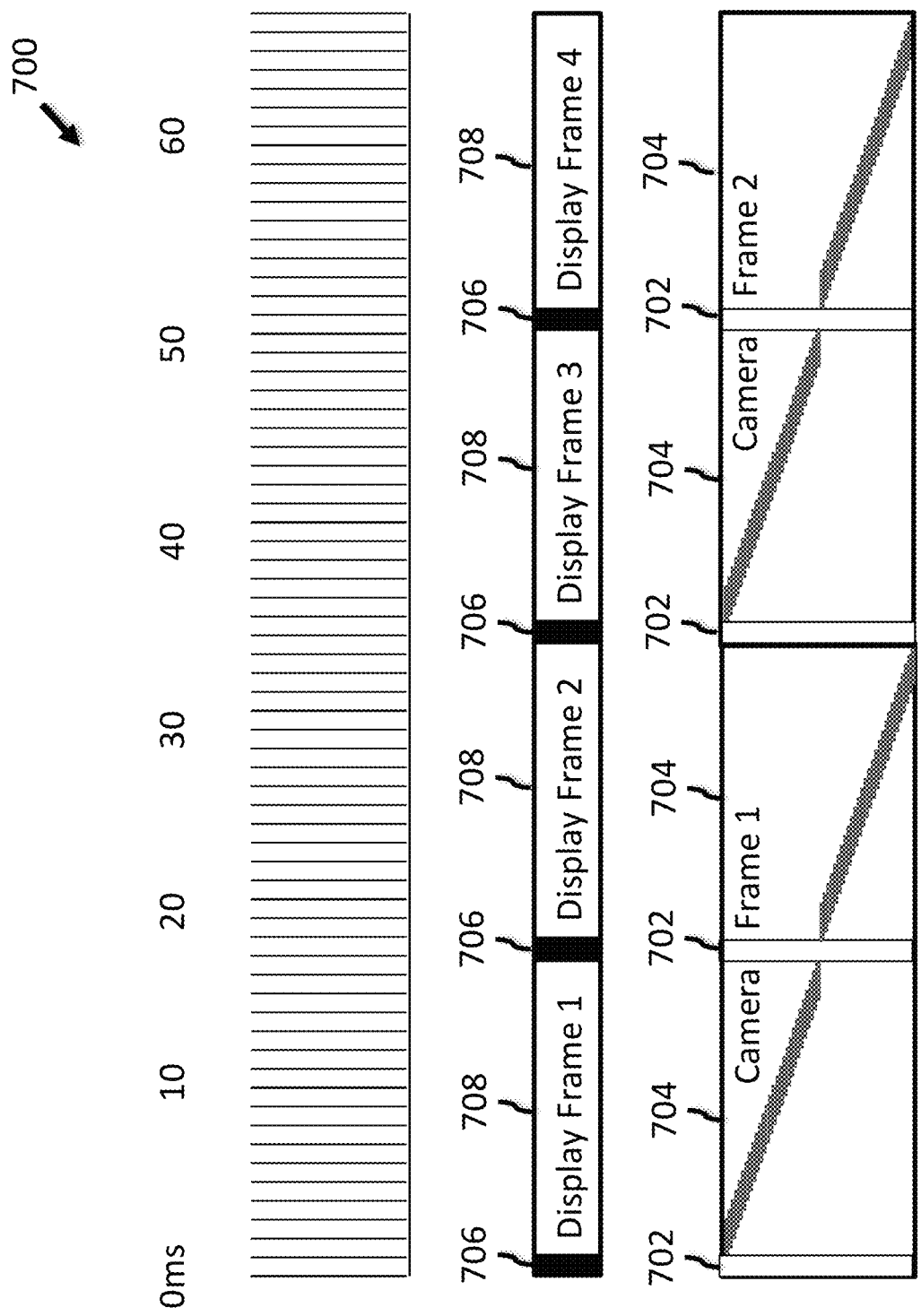
FIG. 7 is a timing diagram of another embodiment of the functions of a CUD module and a camera module included in the memory device of FIG. 4 and/or the processor of FIG. 5.

While the above embodiment of the camera module 404 and FIG. 7 are discussed and shown with a particular timing for a rolling or overlapping function, the various embodiments of a camera module 404 utilizing a rolling or overlapping function are not limited to the specific timing disclosed therein. That is, various other embodiments of a display module 402 managing a display 104 and a camera module 404 managing a camera 105 utilizing a rolling or overlapping function can include different display ON/OFF timings for the CUD 202 (and display area 204) and/or different rolling/overlapping camera exposure ON/OFF timings for the camera 105, each of which possibility is contemplated and included herein. That is, each possible display ON/OFF timing(s) for the CUD 202, each possible rolling/overlapping camera exposure ON/OFF timing(s), and each possible combination(s) thereof are contemplated and included herein.

In some embodiments, the camera module 404 is configured to operate the camera 105 in conjunction with a display module 402 utilizing a skip, delay, and/or staggered function for a CUD 202. Embodiments utilized with CUD areas 202 including the skip, delay, and/or staggered function can be utilized with cameras 105 that include a relatively long exposure time (e.g., a camera exposure time greater than or equal to about 15 ms).

In one embodiment (see, e.g., timing 800 in FIG. 8), the camera module 404 begins a camera frame (e.g., camera frame 1) with the camera 105 turned OFF (e.g., a camera exposure OFF time 802) for a predetermined amount of time that coincides with a display ON time 806 or time in which the CUD 202 (and display area 204) is turned ON (e.g., at the beginning of the display frame (e.g., display frame 1)). The camera module 404 then turns ON the camera 105 (e.g., places a camera exposure ON time 804) at a time during the camera frame 1 occurring after, immediately after, or substantially immediately after a time that coincides with the CUD 202 being turned OFF (e.g., at the beginning of a display OFF time 808). The camera module 404 keeps/maintains the camera 105 turned ON (e.g., a camera exposure ON time 804) for a predetermined period of time in camera frame 1 and turns OFF the camera 105 (e.g., a camera exposure OFF time 802) for the remainder of the camera frame 1 and for the predetermined amount of time in camera frame 2 that coincides with the beginning of display frame 3. The predetermined period of time in camera frame 1 for the camera exposure ON time 804 can be any suitable amount of time and/or the remaining time in camera frame 1 for the camera exposure OFF time 802 can be any suitable amount of time. At a time coinciding with the beginning of the camera exposure OFF time 802 in camera frame 1, the CUD 202 is turned ON (e.g., a display ON time 806) for the predetermined amount of time, which occurs at an intermediate time in display frame 2 and can define a skipped, delayed, and/or staggered display ON time 806 or timing. This process can then be repeated for subsequent camera frames and display frames.

The predetermined period of time that the camera 105 is turned ON (e.g., a camera exposure ON time 804) during camera frame 1 can be any suitable amount of time that allows the camera 105 sufficient exposure time. In some embodiments, the amount of time that the camera 105 is turned ON during camera frame 1 is based on and/or coincides with the camera exposure ON time 804 and/or exposure rate of the camera 105.

Similarly, the predetermined amount of time that the camera 105 is turned OFF (e.g., a camera exposure OFF time 802) during camera frame 1 can be any suitable amount of time. In some embodiments, the amount of time that the camera 105 is turned OFF during the camera frame 1 is based on and/or coincides with the amount of the display ON time to achieve a predetermined level of brightness for the CUD 202.

Figure 8:
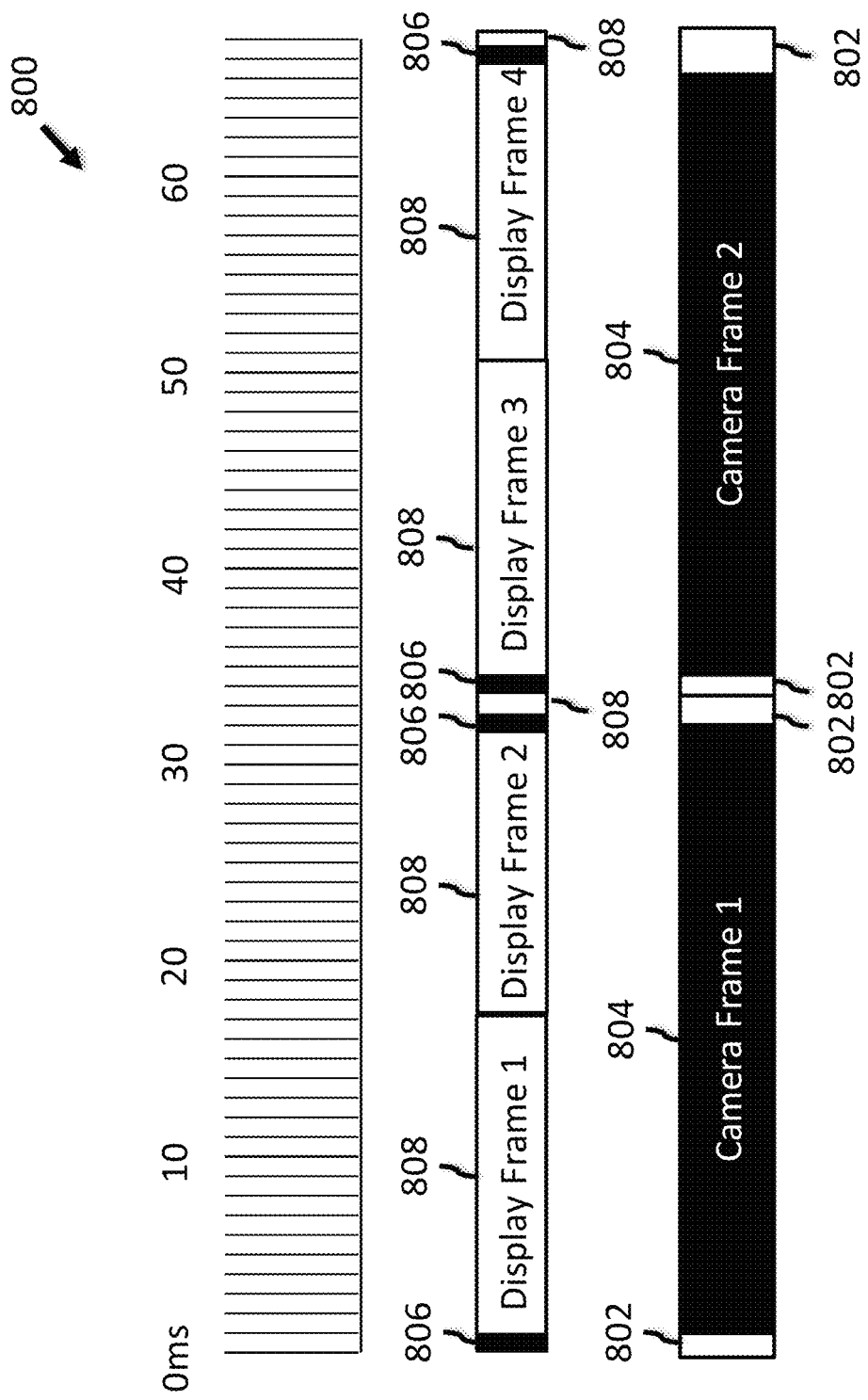
FIG. 8 is a timing diagram of yet another embodiment of the functions of a CUD module and a camera module included in the memory device of FIG. 4 and/or the processor of FIG. 5.

While the above embodiment of the camera module 404 and FIG. 8 are discussed and shown with a particular timing for a camera 105 operating in conjunction with a CUD 202 including a skipped, delayed, and/or staggered function, the various embodiments of this camera module 404 are not limited to the specific timing disclosed therein. That is, various other embodiments of a camera module 404 managing a camera 105 that operates in conjunction with a CUD 202 including a skipped, delayed, and/or staggered function can include different display exposure ON/OFF timings, each of which possibility is contemplated and included herein. That is, each possible different camera exposure ON/OFF timings that can operate in conjunction with a skipped, delayed, and/or staggered display ON/OFF timing(s) for a CUD 202 are contemplated and included herein.

In certain embodiments, the camera module 404 is configured to operate the camera 105 with a skip, delay, and/or staggered function. Cameras 105 including the skipped, delayed, and/or staggered function can be utilized with CUD 202 that include a variable refresh rate (VRR), which may be determined by the display frame render time for a CUD 202 and/or a camera exposure time for the camera 105.

In some embodiments (see, e.g., timing 900 in FIG. 9), the camera module 404 begins a camera frame (e.g., camera frame 1) with the camera 105 turned OFF (e.g., a camera exposure OFF time 902) for a predetermined amount of time that coincides with a display ON time 906 or time in which the CUD 202 (and display area 202) is turned ON (e.g., at the beginning of the display frame (e.g., display frame 1)). The camera module 404 then turns ON the camera 105 (e.g., places a camera exposure ON time 904) at a time during the camera frame 1 occurring after, immediately after, or substantially immediately after a time that coincides with the CUD 202 being turned OFF (e.g., at the beginning of a display OFF time 908) in display frame 1. The camera module 404 keeps/maintains the camera 105 turned ON (e.g., a camera exposure ON time 904) for a period of time in camera frame 1 that coincides with the remaining amount of time in display frame 1 and turns OFF the camera 105

(e.g., a camera exposure OFF time 902) for the remainder of the time in camera frame 1. The camera module 404 keeps/maintains the camera 105 turned OFF (e.g., a camera exposure OFF time 902) for a predetermined period of time in camera frame 2 that ends at a time that coincides with the completion of the next scheduled display ON time 906 or regularly scheduled display ON time 906 for the CUD 202, which occurs in display frame 4 of this embodiment and/or example. The camera module 404 then turns ON the camera 105 (e.g., places a camera exposure ON time 904) at a time during the camera frame 2 occurring after, immediately after, or substantially immediately after a time that coincides with the CUD 202 being turned OFF (e.g., at the beginning of a display OFF time 902) in display frame 4. The camera module 404 keeps/maintains the camera 105 turned ON (e.g., a camera exposure ON time 904) for a predetermined period of time in camera frame 2 that coincides with the remaining amount of time in display frame 2 and turns OFF the camera 105 (e.g., a camera exposure OFF time 902) for the remainder of the time in camera frame 2. This process can be repeated for subsequent camera frames and display frames.

Figure 9:
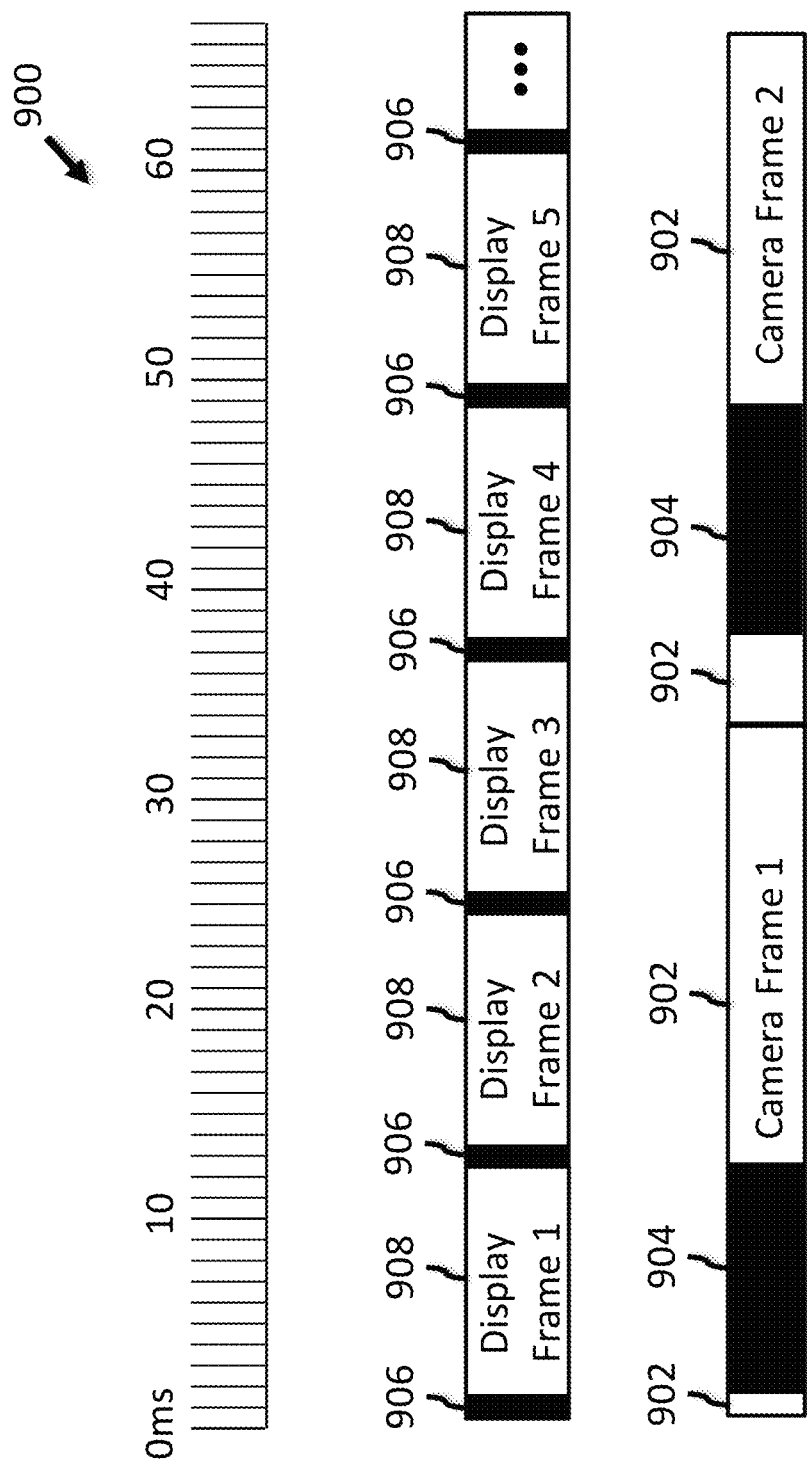
FIG. 9 is a timing diagram of still another embodiment of the functions of a CUD module and a camera module included in the memory device of FIG. 4 and/or the processor of FIG. 5.

While the above embodiment of the camera module 404 and FIG. 9 are discussed and shown with a particular timing for a camera 105 with a skipped, delayed, and/or staggered function (and CUDs 202 including a VRR function), the various embodiments of a camera module 404 utilizing a skipped, delayed, and/or staggered function are not limited to the specific camera exposure ON/OFF timings disclosed therein. That is, various other embodiments of a camera module 404 managing a camera 105 utilizing a skipped, delayed, and/or staggered function can include different skipped, delayed, and/or staggered camera exposure ON/OFF timings for the camera 105, each of which possibility is contemplated and included herein. That is, each possible display ON/OFF timing(s) for the CUD 202, each possible skipped, delayed, and/or staggered camera exposure ON/OFF timing(s) for the camera 105, and each possible combination(s) thereof are contemplated and included herein.

Figure 10:
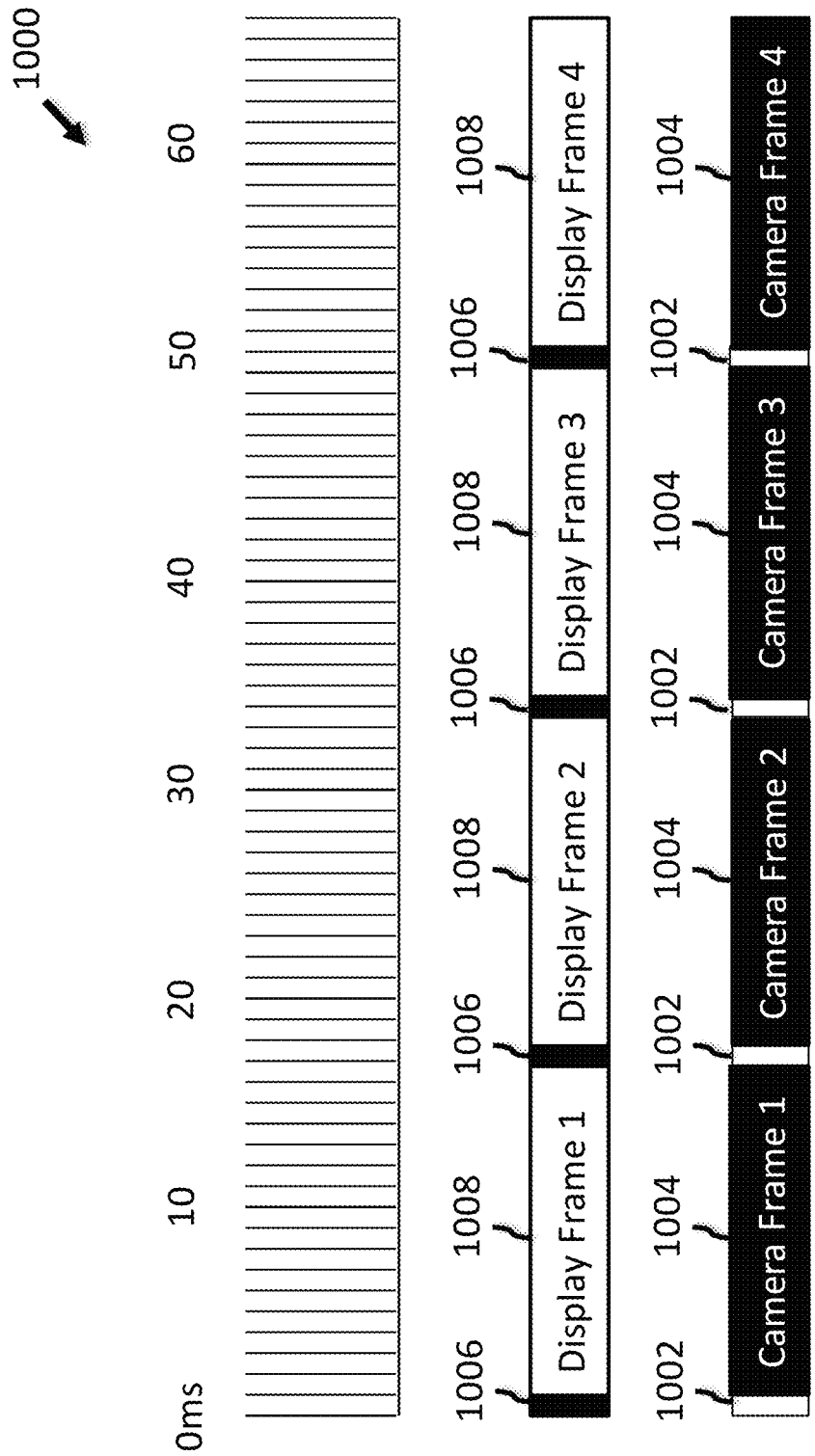
FIG. 10 is a timing diagram of an alternative embodiment of the functions of a CUD module and a camera module included in the memory device of FIG. 4 and/or the processor of FIG. 5.

FIG. 10 illustrates one embodiment of the display 104 and the camera 105 including the same frequency (e.g., including a 1:1 ratio of display frames and camera frames). While this embodiment is shown with reference to 60 Hz and/or 60 FPS, the principles are applicable to other rates with a 1:1 ratio.

At least in the illustrated embodiment, the camera module 404 begins a camera frame (e.g., camera frame 1) with the camera 105 turned OFF (e.g., a camera exposure OFF time 1002) for a predetermined amount of time that coincides with a display ON time 1006 or time in which the CUD 202 (and the display area 204) is turned ON (e.g., at the beginning of the display frame (e.g., display frame 1)). The camera module 404 then turns ON the camera 105 (e.g., places a camera exposure ON time 1004) at a time during the camera frame 1 occurring after, immediately after, or substantially immediately after a time that coincides with the CUD 202 being turned OFF (e.g., at the beginning of a display OFF time 1008). The camera module 404 keeps/maintains the camera 105 turned ON (e.g., a camera display ON time 1004) for the remainder of the camera frame 1 and turns OFF the camera 105 (e.g., a camera OFF time 1002) at the end of camera frame 1. This process can then be repeated for subsequent camera frames and display frames including a 1:1 ratio.

An illumination module 406 may include any suitable hardware and/or software that can control and/or manage the amount of light emitted by and/or the brightness of a CUD 202. In certain embodiments, the illumination module 406 is configured to communicate and/or exchange data/information with the display module 402.

In various embodiments, the illumination module 406 is configured to receive data and/or information from the display module 402 regarding the amount of light being emitted by and/or the brightness at which the data on the display area 204 is being displayed so that the illumination module 406 can adjust the brightness of the CUD 202. In some embodiments, the illumination module 406 is configured to adjust (e.g., increase) the brightness of the CUD 202 so that the brightness of the CUD 202 is the same as and/or matches the brightness of the display area 204.

In additional or alternative embodiments (see, e.g., FIG. 8), the illumination module 406 is configured to automatically and/or autonomously adjust the amount of light emitted by the CUD 202 so that the brightness of the CUD 202 and/or CUD area 202 is the same as and/or matches the brightness of the display area 204. Here, the amount of light emitted by the CUD 202 can be increased in an effort to compensate for the skipped, delayed, and/or staggered display ON periods, as discussed elsewhere herein.

In some embodiments, the display stack-up structure and/or display pixels of the CUD 202 are configured to illuminate for a shorter period of time and with a greater amount of light (e.g., brighter) than the pixels included in the other display area 204 of the display device 104. That is, while the pixels in some embodiments of the CUD 202 may illuminate for a shorter period of time than the pixels in the other display area 204 of the display device 104, because the pixels in the CUD 202 are brighter than the pixels in the other display area 204 of the display device 104, the CUD 202 can have the appearance and/or effect of illuminating at the same brightness are the display area 204.

Referring back to FIGS. 1A and 1B, a processor 108 may include any suitable non-volatile/persistent hardware and/or software configured to perform and/or facilitate performing functions and/or operations for interleaving display ON/OFF periods and camera exposure ON/OFF periods for CUD configurations 202. In various embodiments, the processor 108 includes hardware and/or software for executing instructions in one or more modules and/or applications that can perform and/or facilitate performing functions and/or operations for interleaving display ON/OFF periods and camera exposure ON/OFF periods for CUD configurations 202. The modules and/or applications executed by the processor 108 for interleaving display ON/OFF periods and camera exposure ON/OFF periods for CUD configurations 202 can be stored on and executed from a memory device 106 and/or from the processor 108.

Figure 5:
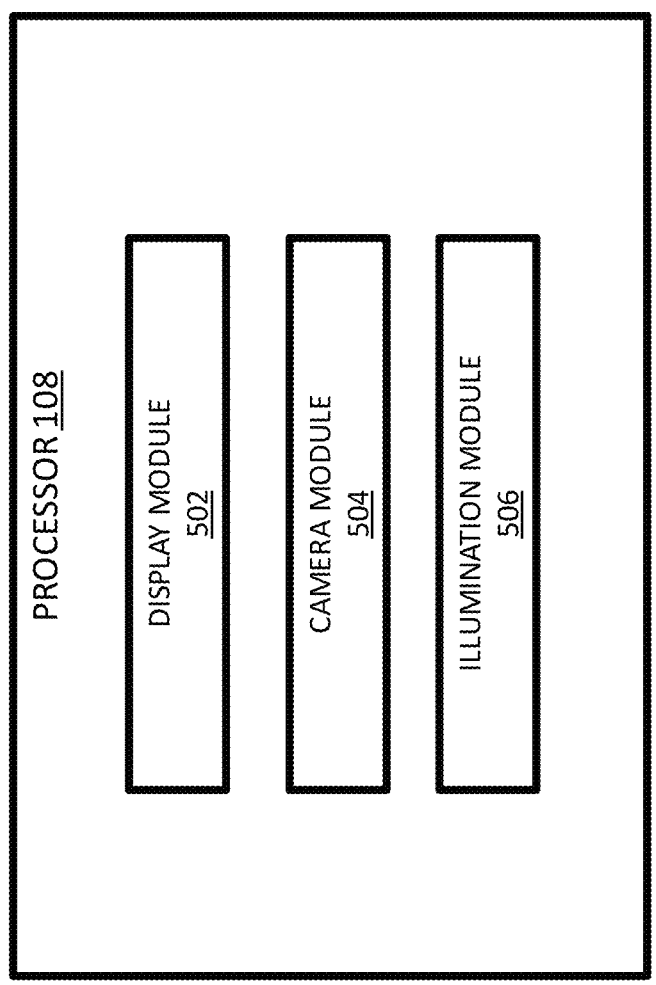
FIG. 5 is a schematic block diagram of one embodiment of a processor that can be included in the computing devices (and/or computing systems) of FIGS. 1A and 1B.

Referring to FIG. 5, FIG. 5 is a schematic block diagram of one embodiment of a processor 108. At least in the illustrated embodiment, the processor 108 includes, among other components, a display module 502, a camera module 504, and an illumination module 506 similar to the display module 402, camera module 404, and illumination module 406 included in the memory device 106, discussed elsewhere herein. Accordingly, the processor 108 can include the display module 502, camera module 504, and illumination module 506 without or in addition to the display module 402, a camera module 404, and illumination module 406 of the memory device 106.

Figure 11:
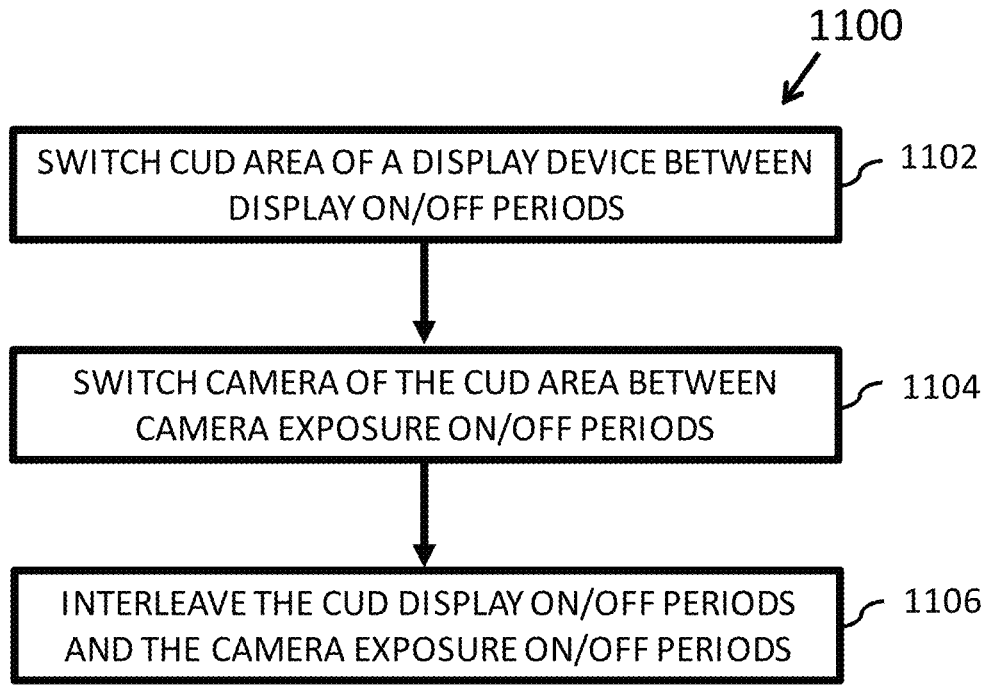
FIG. 11 is a schematic flow chart diagram illustrating one embodiment of a method for interleaving display ON/OFF periods and camera exposure ON/OFF periods for CUD configurations.

FIG. 11 is a schematic flow chart diagram illustrating one embodiment of a method 1100 for interleaving display ON/OFF periods and camera exposure ON/OFF periods for CUD configurations 202. At least in the illustrated embodiment, the method 1100 begins by a processor 108 switching a CUD area 202 (and display area 204) of a display device 104 between display ON and display OFF periods (block 1102), as discussed elsewhere herein. The processor 108 switches a camera 105 positioned behind the CUD area 202 of the display device 104 between camera exposure ON and camera exposure OFF periods (block 1104), as discussed elsewhere herein.

In various embodiments, the processor 108 interleaves the display ON/OFF periods and the camera exposure ON/OFF periods (block 1106). The interleaved display ON/OFF periods and camera exposure ON/OFF periods may include any of the embodiments discussed herein.

Figure 12:
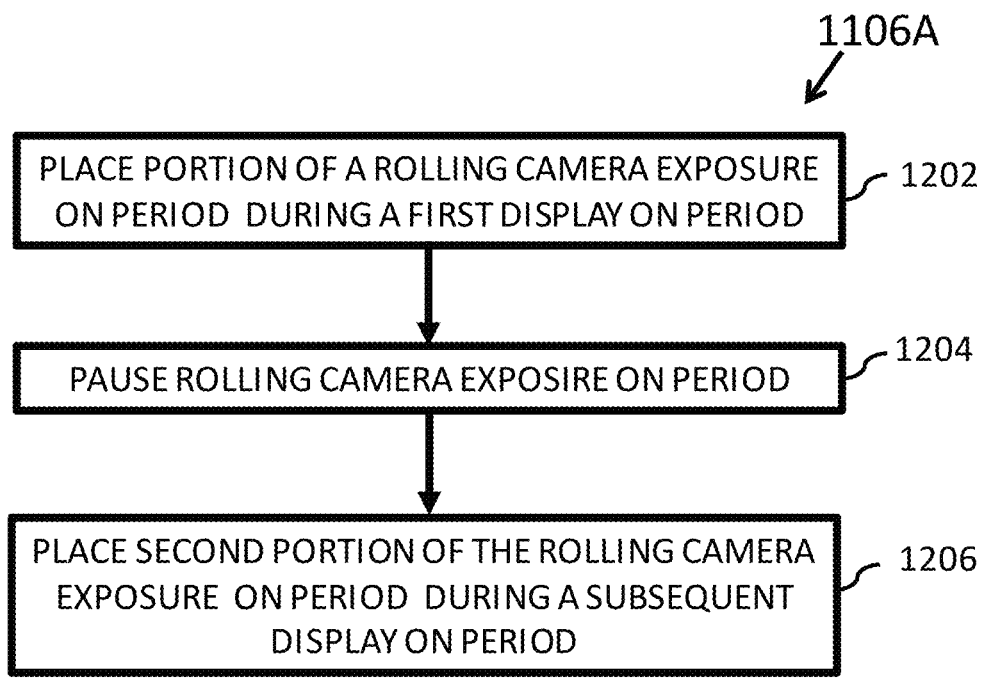
FIG. 12 is a schematic flow chart diagram illustrating one embodiment of interleaving display ON/OFF periods and camera exposure ON/OFF periods that can be included in the method of FIG. 11.

FIG. 12 is a schematic flow chart diagram illustrating one embodiment of interleaving the display ON/OFF periods and the camera exposure ON/OFF periods 1106A included in the method 1200. At least in the illustrated embodiment, interleaving the display ON/OFF periods and the camera exposure ON/OFF periods 1106A begins by a processor 108 placing a first portion of a rolling camera exposure ON period for a camera 105 during a first display ON period for a CUD 202 (block 1202), as discussed elsewhere herein.

The processor 108 then pauses the rolling camera exposure ON period for a predetermined amount of time (block 1204), as discussed elsewhere herein. In some embodiments, the processor 108 then places a second portion of the rolling camera exposure ON period during a subsequent display ON period for the CUD 202 (block 1206), as discussed elsewhere herein.

Figure 13:
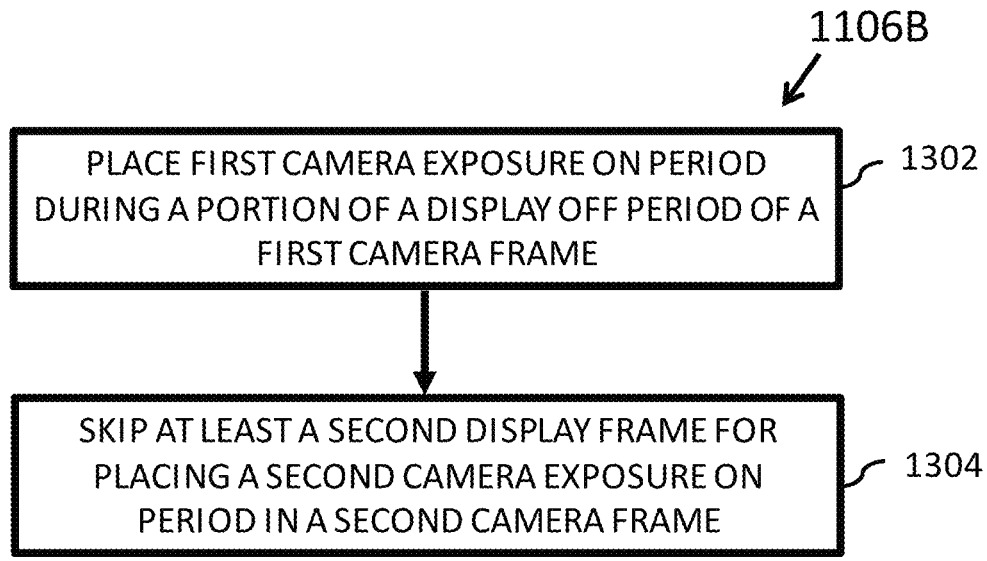
FIG. 13 is a schematic flow chart diagram illustrating another embodiment of interleaving display ON/OFF periods and camera exposure ON/OFF periods that can be included in the method of FIG. 11.

FIG. 13 is a schematic flow chart diagram illustrating another embodiment of interleaving the display ON/OFF periods and the camera exposure ON/OFF periods 1106B included in the method 1100. At least in the illustrated embodiment, interleaving the display ON/OFF periods and the camera exposure ON/OFF periods 1106B begins by a processor 108 placing a first camera exposure ON period for a camera 105 during a portion of a display OFF period for a CUD display 304 (block 1302), as discussed elsewhere herein. The processor 108 then skips at least an amount of time coinciding with an amount of time in a second display frame for placing a second camera exposure ON period in a second camera frame (block 1304), as discussed elsewhere herein.

Figure 14:
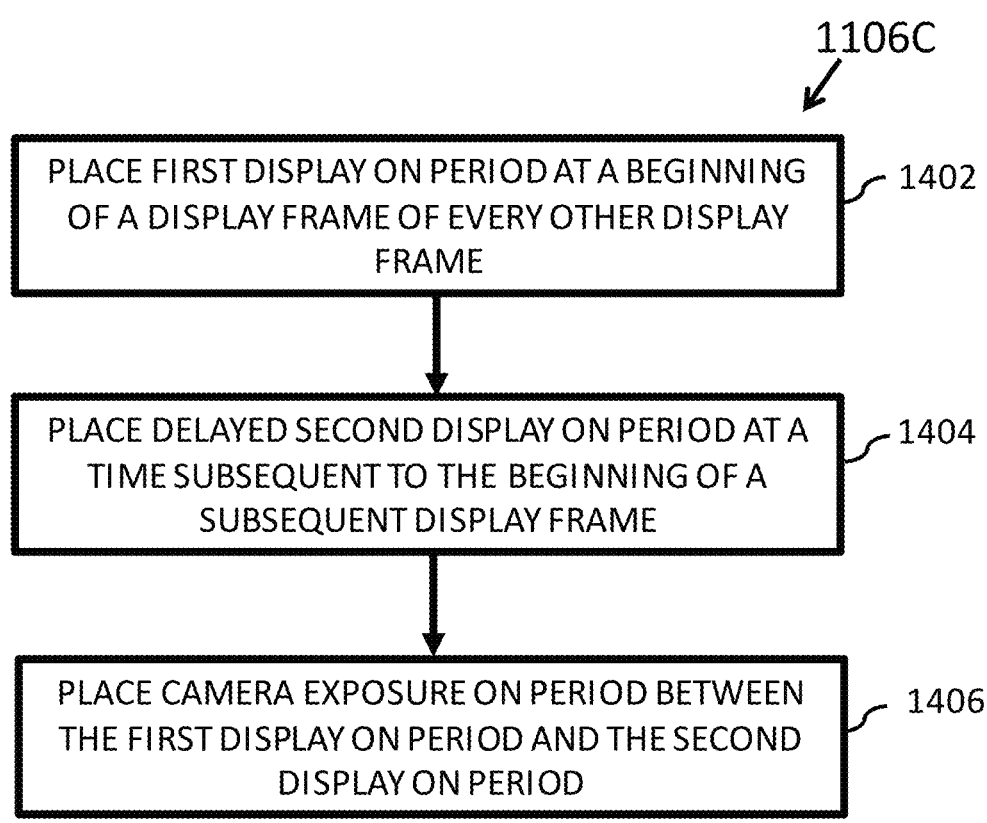
FIG. 14 is a schematic flow chart diagram illustrating yet another embodiment of interleaving display ON/OFF periods and camera exposure ON/OFF periods that can be included in the method of FIG. 11.

FIG. 14 is a schematic flow chart diagram illustrating yet another embodiment of interleaving the display ON/OFF periods and the camera exposure ON/OFF periods 1106C included in the method 1100. At least in the illustrated embodiment, interleaving the display ON/OFF periods and the camera exposure ON/OFF periods 1106C begins by a processor 108 placing a first display ON period for a CUD 202 at a beginning of a display frame of every other display frame (block 1402), as discussed elsewhere herein.

The processor 108 then places a delayed second display ON period at a time subsequent to the beginning of a subsequent display frame (block 1404), as discussed elsewhere herein. In some embodiments, the processor 108 then places a camera exposure ON period for the camera 105 between the first display ON period and the second display ON period the CUD 202 (block 1406), as discussed elsewhere herein.

Figure 15:
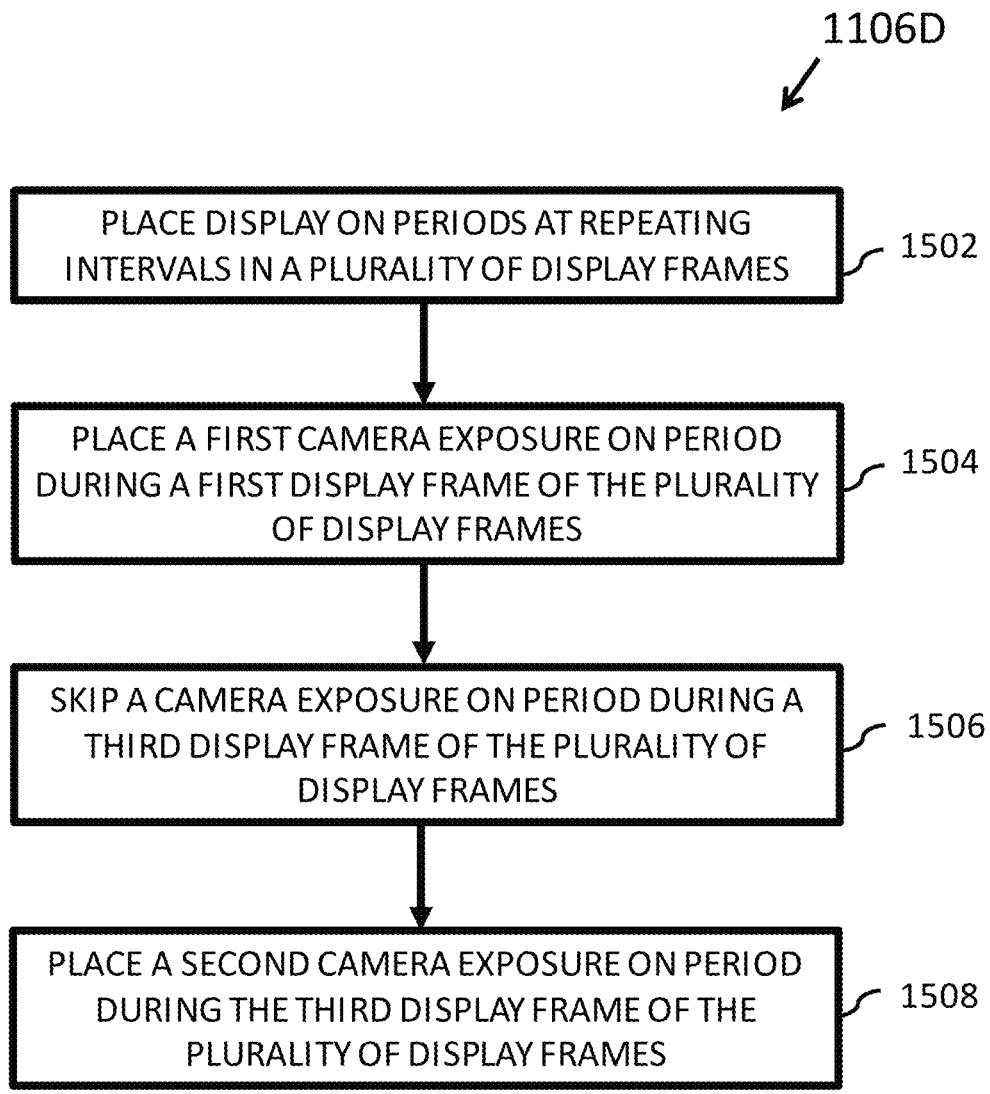
FIG. 15 is a schematic flow chart diagram illustrating still another embodiment of interleaving display ON/OFF periods and camera exposure ON/OFF periods that can be included in the method of FIG. 11.

FIG. 15 is a schematic flow chart diagram illustrating still another embodiment of interleaving the display ON/OFF periods and the camera exposure ON/OFF periods 1106D included in the method 1100. At least in the illustrated embodiment, interleaving the display ON/OFF periods and the camera exposure ON/OFF periods 1106D begins by a processor 108 placing display ON periods for a CUD display 304 at repeating interval or repeating regular intervals in a plurality of display frames (block 1502), as discussed elsewhere herein.

The processor 108 then places a first camera exposure ON period at a time in a camera frame that coincides with a first display frame of the plurality of display frames (block 1504), as discussed elsewhere herein. In some embodiments, the processor 108 then skips a camera exposure ON period during a subsequent display frame (e.g., a third display frame) of the plurality of display frames (block 1506), as discussed elsewhere herein. The processor 108 then places a second camera exposure ON period during the subsequent display frame (e.g., a third display frame) of the plurality of display frames (block 1508), as discussed elsewhere herein.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a display screen including a display area and a camera-under-display (CUD) area adjacent to the display area, wherein:
the display area and the CUD area configured to be switched between display ON periods and display OFF periods, and
the display ON periods for the CUD area are shorter and include a greater amount of light than the display ON periods for the display area to provide an effect that the display area and the CUD area include a same brightness during the display ON periods;
a camera positioned behind the CUD area of the display screen, the camera configured to be switched between exposure ON periods and exposure OFF periods;
a processor of an information handling device; and
a memory configured to store code executable by the processor to:
interleave the display ON/OFF periods and the exposure ON/OFF periods such that the CUD area appears to continuously display data and the camera is simultaneously able to capture images.

2. The apparatus of claim 1, wherein the exposure ON/OFF periods of the camera comprise a rolling shutter cycle.

3. The apparatus of claim 2, wherein interleaving the display ON/OFF periods and the exposure ON/OFF periods comprises:
placing a first portion of a rolling exposure ON period during a first display OFF period of a display frame; and
placing a second portion of the rolling exposure ON period during a second display OFF period of a subsequent display frame.

4. The apparatus of claim 1, wherein the exposure ON/OFF periods of the camera comprise a global shutter cycle.

5. The apparatus of claim 1, wherein interleaving the display ON/OFF periods and the exposure ON/OFF periods comprises:
placing a first exposure ON period for the camera during a portion of a display OFF period of a first display frame of a plurality of sequential display frames, the first exposure ON period occurring in a first camera frame for the camera; and skipping at least a second display frame of the plurality of sequential display frames for placement of a second exposure ON period in a second camera frame for the camera.

6. The apparatus of claim 1, wherein the display ON/OFF periods of the display comprise staggered display ON periods.

7. The apparatus of claim 6, wherein interleaving the staggered display ON periods and the exposure ON/OFF periods comprises:
placing a first display ON period at a first beginning of a first display frame of every other display frame of repeating pairs of display frames;
placing a delayed second display ON period at a time subsequent to a second beginning of a second display frame of the every other display frame of the repeating pairs of display frames; and
placing an exposure ON period between the first display ON period and the second display ON period.

8. The apparatus of claim 1, wherein the exposure ON/OFF periods of the camera comprise staggered exposure ON periods.

9. The apparatus of claim 8, wherein interleaving the display ON/OFF periods and the staggered exposure ON periods comprises:
placing the display ON periods at repeating intervals of a plurality of display frames;
placing a first exposure ON period for the camera during a first display frame of the plurality of display frames, the first exposure ON period forming a first portion of a first camera frame occurring within the first display frame and not occurring in at least one subsequent second display frame of the plurality of display frames; and
placing a second exposure ON period for the camera during a third display frame of the plurality of display frames occurring after the at least one subsequent second display frame, the second exposure ON period forming a second portion of a second camera frame occurring within the third display frame and not occurring in at least one subsequent fourth display frame of the plurality of display frames.

10. The apparatus of claim 1, wherein:
the CUD area is positioned at any location on the display;
the display further comprises a display area adjacent to the CUD area;
the display area comprises a first set of pixels;
the CUD area further comprises a second set of pixels; and
the second set of pixels in the CUD area include a greater brightness for a shorter amount of time than the first set of pixels in the display area adjacent to the CUD area such that the CUD area and the display area adjacent to the CUD area appear to include a same brightness.

11. A method, comprising:
switching, by a processor, a camera-under-display (CUD) area and a display area of a display screen between display ON periods and display OFF periods, wherein the display ON periods for the CUD area are shorter and include a greater amount of light than the display ON periods for the display area to provide an effect that the display area and the CUD area include a same brightness during the display ON periods;
switching a camera positioned behind the CUD area of the display screen between exposure ON periods and exposure OFF periods; and interleaving the display ON/OFF periods and the exposure ON/OFF periods such that the CUD area appears to continuously display data and the camera is simultaneously able to capture images.

12. The method of claim 11, wherein:
the exposure ON/OFF periods of the camera comprise a rolling shutter cycle; and
interleaving the display ON/OFF periods and the exposure ON/OFF periods comprises:
placing a first portion of a rolling exposure ON period during a first display OFF period of a display frame, and
placing a second portion of the rolling exposure ON period during a second display OFF period of a subsequent display frame.

13. The method of claim 11, wherein:
the exposure ON/OFF periods of the camera comprise a global shutter cycle; and
interleaving the display ON/OFF periods and the exposure ON/OFF periods comprises:
placing a first exposure ON period for the camera during a portion of a display OFF period of a first display frame of a plurality of sequential display frames, the first exposure ON period occurring in a first camera frame for the camera, and
skipping at least a second display frame of the plurality of sequential display frames for placement of a second exposure ON period in a second camera frame for the camera.

14. The method of claim 11, wherein:
the display ON/OFF periods of the display comprise staggered display ON periods; and
interleaving the staggered display ON periods and the exposure ON/OFF periods comprises:
placing a first display ON period at a first beginning of a first display frame of every other display frame of repeating pairs of display frames,
placing a delayed second display ON period at a time subsequent to a second beginning of a second display frame of the every other display frame of the repeating pairs of display frames, and
placing an exposure ON period between the first display ON period and the second display ON period.

15. The method of claim 11, wherein:
the exposure ON/OFF periods of the camera comprise staggered exposure ON periods; and
interleaving the display ON/OFF periods and the staggered exposure ON periods comprises:
placing the display ON periods at repeating intervals of a plurality of display frames,
placing a first exposure ON period for the camera during a first display frame of the plurality of display frames, the first exposure ON period forming a first portion of a first camera frame occurring within the first display frame and not occurring in at least one subsequent second display frame of the plurality of display frames, and
placing a second exposure ON period for the camera during a third display frame of the plurality of display frames occurring after the at least one subsequent second display frame, the second exposure ON period forming a second portion of a second camera frame occurring within the third display frame and not occurring in at least one subsequent fourth display frame of the plurality of display frames.

16. A computer program product comprising a computer-readable storage medium configured to store code executable by a processor, the executable code comprising code to perform:
- switching a camera-under-display (CUD) area and a display area of a display screen between display ON periods and display OFF periods, wherein the display ON periods for the CUD area are shorter and include a greater amount of light than the display ON periods for the display area to provide an effect that the display area and the CUD area include a same brightness during the display ON periods;
- switching a camera positioned behind the CUD area of the display screen between exposure ON periods and exposure OFF periods; and
- interleaving the display ON/OFF periods and the exposure ON/OFF periods such that the CUD area appears to continuously display data and the camera is simultaneously able to capture images.

17. The computer program product of claim 16, wherein:
the exposure ON/OFF periods of the camera comprise a rolling shutter cycle; and
interleaving the display ON/OFF periods and the exposure ON/OFF periods comprises:
- placing a first portion of a rolling exposure ON period during a first display OFF period of a display frame, and
- placing a second portion of the rolling exposure ON period during a second display OFF period of a subsequent display frame.

18. The computer program product of claim 16, wherein:
the exposure ON/OFF periods of the camera comprise a global shutter cycle; and
interleaving the display ON/OFF periods and the exposure ON/OFF periods comprises:
- placing a first exposure ON period for the camera during a portion of a display OFF period of a first display frame of a plurality of sequential display frames, the first exposure ON period occurring in a first camera frame for the camera, and
- skipping at least a second display frame of the plurality of sequential display frames for placement of a second exposure ON period in a second camera frame for the camera.

19. The computer program product of claim 16, wherein:
the display ON/OFF periods of the display comprise staggered display ON periods; and
interleaving the staggered display ON periods and the exposure ON/OFF periods comprises:
- placing a first display ON period at a first beginning of a first display frame of every other display frame of repeating pairs of display frames,
- placing a delayed second display ON period at a time subsequent to a second beginning of a second display frame of the every other display frame of the repeating pairs of display frames, and
- placing an exposure ON period between the first display ON period and the second display ON period.

20. The computer program product of claim 16, wherein:
the exposure ON/OFF periods of the camera comprise staggered exposure ON periods; and
interleaving the display ON/OFF periods and the staggered exposure ON periods comprises:
- placing the display ON periods at repeating intervals of a plurality of display frames,
- placing a first exposure ON period for the camera during a first display frame of the plurality of display frames, the first exposure ON period forming a first portion of a first camera frame occurring within the first display frame and not occurring in at least one subsequent second display frame of the plurality of display frames, and
- placing a second exposure ON period for the camera during a third display frame of the plurality of display frames occurring after the at least one subsequent second display frame, the second exposure ON period forming a second portion of a second camera frame occurring within the third display frame and not occurring in at least one subsequent fourth display frame of the plurality of display frames.

* * * * *